Patented Apr. 28, 1931

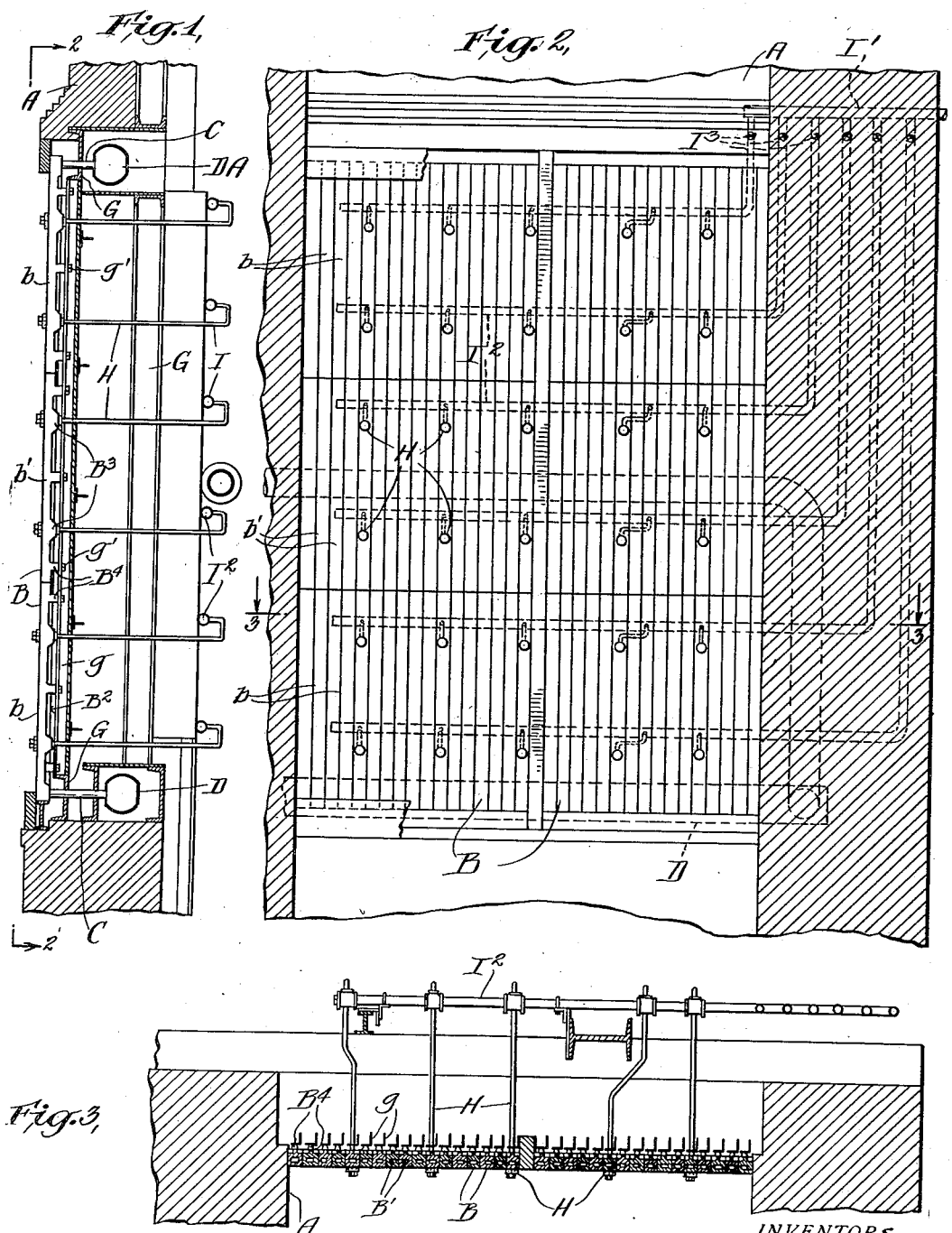

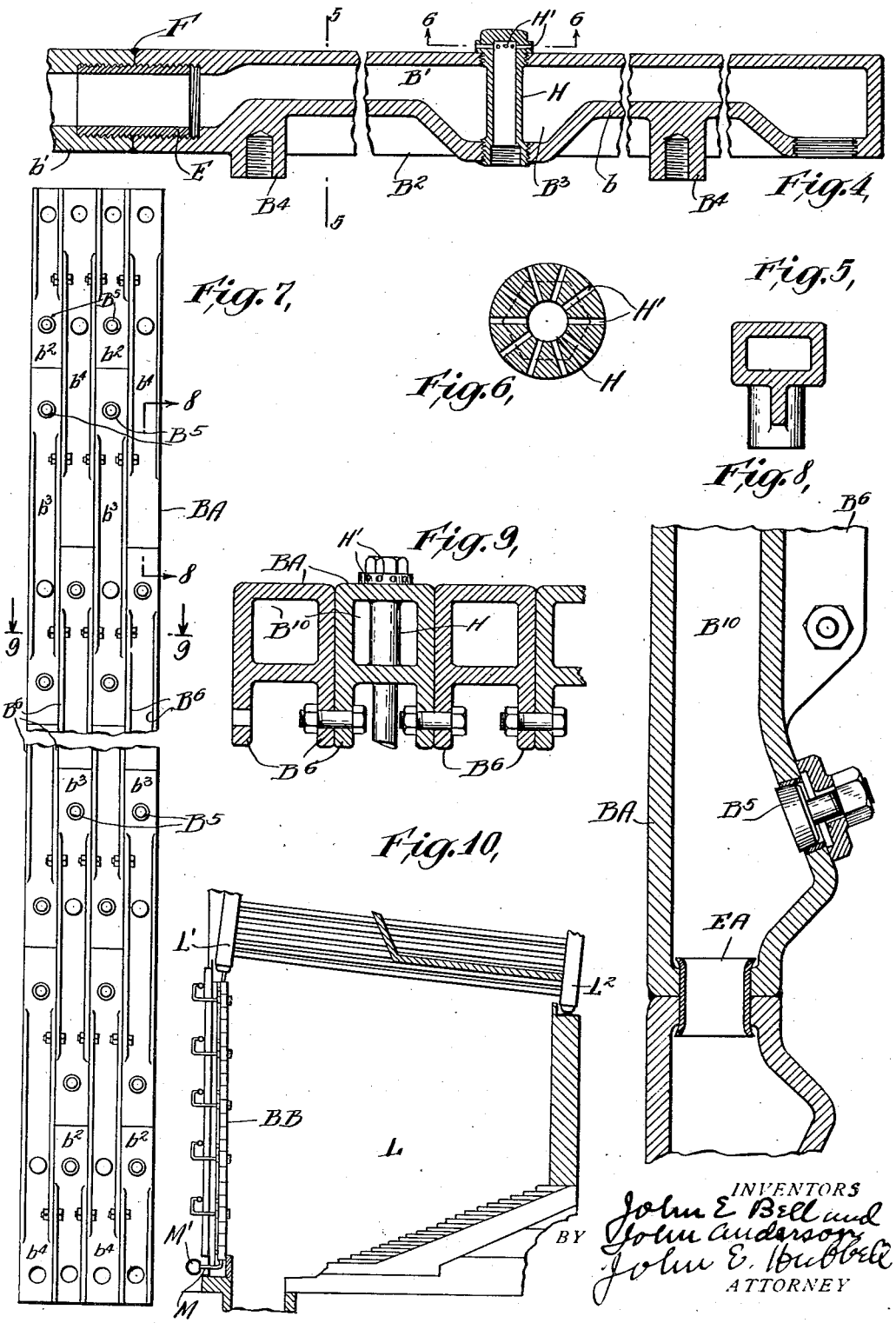

1,802,456

UNITED STATES PATENT OFFICE

JOHN E. BELL, OF BROOKLYN, NEW YORK, AND JOHN ANDERSON, OF MILWAUKEE, WISCONSIN, ASSIGNORS TO FOSTER WHEELER CORPORATION, OF NEW YORK, N. Y., A CORPORATION OF NEW YORK

APPARATUS FOR UTILIZING RADIANT HEAT IN HEATING FLUIDS

Application filed April 26, 1923. Serial No. 634,713.

The general object of our present invention is to provide improved apparatus for absorbing radiant heat and transmitting the heat so absorbed to a fluid circulating through channels in the apparatus. The invention is especially well adapted for use in so-called radiant heat superheaters mounted in the walls of boiler furnace combustion chambers, and transmitting heat absorbed from said chambers to steam flowing through channels in the apparatus, but our improved apparatus may be used in other locations and for other purposes.

In accordance with the present invention, we construct heating apparatus of one piece elements or sections each having an external surface exposed to the source of radiant heat and having a channel or containing space for the fluid to be heated. These hollow elements or sections are advantageously and preferably cast of steel or a steel alloy. Preferably each element or section is formed with a smooth external heat absorbing face separated by a wall of substantial uniform thickness from the fluid channel or chamber in the element. The formation of the elements of cast metal in the manner described makes it possible to proportion the heat absorbing surface, the cross section and the surfaces of the fluid containing space, and the wall thickness between the heat absorbing surface and fluid containing space in the manner best adapted for any particular operating conditions.

The various features of novelty which characterize our invention are pointed out with particularity in the claims annexed to, and forming a part of this specification. For a better understanding of the invention, however, its advantages and particular objects attained with it, reference should be had to the accompanying drawings and descriptive matter in which we have illustrated and described preferred embodiments of our invention.

Of the drawings:

Fig. 1 is a vertical section of a portion of a boiler furnace combustion chamber wall in which a radiant heat superheater is incorporated;

Fig. 2 is an elevation of the inner, or combustion chamber side of the superheater;

Fig. 3 is a partial section on the line 3—3 of Fig. 2;

Fig. 4 is a longitudinal section through a portion of a superheater element with parts broken away;

Fig. 5 is a section on the line 5—5 of Fig. 4;

Fig. 6 is a section on the line 6—6 of Fig. 4;

Fig. 7 is an elevation of the outer side of a portion of a superheater composed of elements differing in form from those shown in Figs. 1 to 6 inclusive;

Fig. 8 is a partial longitudinal section on the line 8—8 of Fig. 7;

Fig. 9 is a transverse section on the line 9—9 of Fig. 7; and

Fig. 10 is an elevation of a portion of a boiler including radiant heat absorbing boiler heating surface.

In the drawings, and referring first to the construction shown in Figs. 1 to 6, A represents the wall of the combustion chamber of a boiler furnace in which a superheater constructed in accordance with the present invention is incorporated. The superheater is composed of a plurality of hollow elements B which are shown as vertically disposed, though this is not essential. Each element B is connected at its ends by horizontal pipes C to inlet and outlet headers D and DA. As shown each element B consists of two similar end sections $b$, and an intermediate section $b'$, which has its ends connected to the adjacent ends of the two end sections $b$.

The sections $b$ and $b'$, as shown, are made of cast metal, and adjacent ends of the sections $b$ and $b'$ of each element B are connected by means of an internal nipple or sleeve E in threaded engagement with each connected section. Preferably the parts are so shaped and threaded together as to bring the abutting ends of the connected sections snugly against one another, and the joint between them is advantageously sealed by welding the sections together, as indicated at F. The formation of each element B of a plurality of sections connected together end to end while not always essential, is desirable in many cases, particularly where each element is of the length required to extend along one side of the combustion chamber of a large boiler furnace, as it simplifies the manufacture of the sections and tends to avoid or minimize the effects of unequal thermal expansion and contraction in different portions of the section. Each of the sections $b$ and $b'$ has a plane heat absorbing face, at its inner or furnace side, and has side surfaces perpendicular to its inner face, and in the assembled superheater the inner faces of the various sections unite to form a substantially smooth or plane heat absorbing surface. Each section $b$ and $b'$ is formed with a steam channel or thoroughfare $B'$, extending longitudinally of the element and generally rectangular in cross section, with the wall between the channel and the heat absorbing face of the element of uniform thickness. As shown the channel $B'$ is enlarged at the ends of the sections to receive the nipples E, and to provide suitable inlet and outlet chambers into which the pipes C open. The pipes C may advantageously be expanded into place. The thoroughfares $B'$ in some of the sections are also enlarged at points $B^3$ along their length to provide sufficient flow space past the soot blower pipes H hereinafter referred to. The sections $b$ and $b'$, are each provided at their rear sides with a central longitudinal extending stiffening rib $B^2$ which merges into the enlargements of the section at its ends and at the points $B^3$, and into transverse bosses or ribs $B^4$ provided at the back of each section for connecting the element of which the section forms a part to suitable supporting means.

The particular form of supporting means shown comprises a stiffening and alignment element $g$ in the form of an angle bar arranged back of each element B. The angle bars $g$ are formed with holes to receive bolts $g'$ tapped into the bosses $B^4$. To accommodate relative longitudinal expansion of each element B and the corresponding support $g$, each element may be rigidly clamped to its support at one point by the corresponding bolt $g'$, while the holes in the element through which the other bolts $g'$ pass may be longitudinally slotted in a manner analogous to that disclosed in the prior application of one of us, to-wit: of John E. Bell Serial No. 607,781, filed December 19, 1922. The angle bars $g$ may, or may not be connected to, and form a part of the structural metal framework G back of the superheater, which assists in carrying the weight of the masonry furnace wall above the superheater. If so connected the angle bars $g$ form means for carrying the weight of the superheater elements, and when not so connected, the superheater elements may be suspended from their upper ends or may rest at their lower ends against a suitable abutment or support. In any event, the pipes C provide the flexibility needed to accommodate the expansion and contraction of the elements B relative to the external columns, buckstays or framework G to which the headers D and DA are ordinarily anchored.

An important practical advantage of the type of apparatus shown in Figs. 1 to 6, arises from the facility with which simple and effective provisions may be made for adequately cleaning soot and ashes or other deposited furnace dust from the heat absorbing surface of the superheater. The provisions shown for this purpose comprise pipes H which extend across the thoroughfares $B'$ in some of the elements B. The pipes H have threaded end portions screwed into threaded openings formed in the front and back walls of elements B in which they are mounted. Each pipe H has an enlarged head at the furnace chamber side of the superheater, formed with discharge orifices $H'$ through which a suitable cleaning fluid, as superheated steam or air or both may be discharged in radial jets closely adjacent, and parallel to the inner face of the superheater. Advantageously, as illustrated, the cleaning pipes H are distributed at intervals along the length of some only of the elements in such manner, that the jets discharged will adequately clean the entire inner face of the superheater. The cleaning fluid is supplied to the various pipes H by piping I. In the arrangement shown, the piping I comprises a supply main $I'$, and branch pipes $I^2$, each of which is connected to the supply main by a separate supply valve $I^3$, and is connected to all of the pipes H at the same level. This arrangement permits separate sections of the superheater face located at different levels to be separately cleaned.

The superheater construction illustrated in Figs. 1 to 6 is simple, durable and relatively inexpensive to construct and maintain. The number of sections into which each superheater element B is advantageously divided to facilitate the casting of the sections, and to avoid all liability of objectionable warping or cracking of the elements under the temperatures and pressures to which they are subjected in operation, necessitates but a comparatively few number of joints in the elements, and the character of these joints is such as to minimize leakage troubles.

The radiant heat superheater devised by us is an improved form of the apparatus disclosed in the prior Patent No. 1,296,739, granted March 11, 1919, to one of us, to-wit: John E. Bell.

The separation of the steam space in each element B from the face of the element absorbing radiant heat, by an integral metal wall of substantially uniform thickness, gives our apparatus important practical advantages over the heretofore used form of radiant heat superheater constructed under Patent No. 1,296,739, in which wrought metal tubes of circular cross section are encased in cast metal blocks having flat heat absorbing faces. For one thing the fact that the metal wall through which the heat is conducted is integral in our apparatus, minimizes the temperature differential between the steam swept and heat absorbing surfaces of the elements required to conduct a given amount of heat in a given time through said wall. The required temperature differential is further minimized, moreover, by the fact that with our apparatus, the average length of the various paths of flow of the heat through the metal wall is less than in the form of construction heretofore used. In practice the reduction in temperature differential required for a given quantity rate of heat conduction, permits of a reduction in the temperature of the radiant heat absorbing surface of the superheater, thereby increasing the rate of heat absorption per unit of area of said surface, and consequently increasing the superheating capacity of the apparatus. The reduction in average absorbing surface temperature thus secured, and the avoidance of local variations in the temperature of said surface, which would result from varying wall thickness between said surface and the steam space, desirably minimizes deterioration of the apparatus under the operating conditions to which it is subjected. The practical importance of the features just referred to become apparent, when account is taken of the fact that with perfect contact (not always maintained) between the casing blocks and tubes of the form of apparatus heretofore used, a heat head between steam swept and heat absorbing surfaces of from 300° to 500° F. is required to conduct heat between said surface at a rate readily obtainable in practice with our apparatus with a heat head of 100° to 200° F.

As the drawings clearly indicate, the walls of the conduit elements are massive, and by the term "massive" as used herein we mean that the walls are substantially thicker than they are in ordinary boiler water tubes having the same flow capacity and adapted to withstand the same internal pressures. This massive wall construction is provided not primarily because it is necessary to resist the bursting stresses created by the fluid within, but because it is desirable to provide for a considerable flow of heat from the heat absorbing surface of the new element to the sides and rear of the channel in the element, so that the heat absorption by the fluid within the channel is not wholly the result of the contact of the fluid with the portion of the wall of the channel between the latter and the source of radiant heat. The increased heat absorption by the fluid within the elements thus made possible, materially reduces the temperature of the heat absorbing faces of the elements below what those temperatures would be if the element walls were no thicker than the walls of ordinary boiler tubes. This reduction in heat absorbing temperature, as already indicated, increases the rate of heat absorption and minimizes the tendency to surface deterioration as a result of oxidation or analogous actions. The massive wall construction also provides a heat capacity tending to minimize fluctuations in the rate of heat absorption by the fluid passing through the conduits, and minimizes the evil consequences of such deterioration of the exposed surfaces of the elements as may occur.

In a preferred construction, as illustrated in Fig. 5, each element is of generally rectangular internal and external outline in transverse cross section, and the transverse cross sectional dimensions are greater in a direction parallel to the heat absorbing face of the element than in a direction transverse thereto. By thus shaping and proportioning the elements in transverse cross section, the ratio of the area of element surface in contact with the steam to the area of the surface of the element absorbing radiant heat is increased over what it would be in an element square or circular in cross section. This tends, as will be apparent from what has been said, to a desirable reduction in the temperature of the heat absorbing surfaces of the elements. The transverse sectional shape and dimensions illustrated in Fig. 5 also desirably tend to an increased steam velocity through each element as compared with the steam velocity in an element of the same weight and through which the same quantity of steam is passed but in which the channel is square or circular in cross section.

When the superheater is formed of cast metal sections as illustrated the steam channels or thoroughfares B' in the elements B, may readily be shaped to have the cross section required to give the desired velocity and heat transfer rate from the metal to the steam. We contemplate in ordinary practice, making these channels rectangular in cross section and of greater width parallel to the heat absorbing surface, than in a transverse direction as shown in Fig. 5.

In one contemplated use of a radiant heat superheater of the particular construction illustrated in Figs. 1 to 6, the superheater elements are each about 16 feet long, and the width of the heat absorbing face of each element is three and three quarters inches; and the superheater is incorporated in the wall of a furnace chamber in which powdered fuel is burned, and in which the average temperature is normally in the neighborhood of 2500° F.; and the pressure of the steam is three hundred pounds per square inch, and the superheater is intended to superheat the steam passing through it approximately 250° F. The dimensions, temperatures and pressure just stated, are given, not by way of limitation, but as an illustrative example of one type of installation in which the invention is used with advantage. Those skilled in the art will understand, of course, that apparatus constructed generally as shown in Figs. 1 to 6, may vary greatly in dimensions and relative proportions, as well as in form, and that such apparatus is well adapted for use under widely differing conditions. In Figs. 7, 8, and 9, we have illustrated, by way of example, some of the changes in form of the apparatus shown in Figs. 1 to 6 which we may make. In Figs. 7, 8 and 9, each superheater element BA is made up of one short end section $b^2$, one long end section $b^4$, and one or more intermediate sections $b^3$, and the adjacent elements BA are turned end to end, so that the section of adjacent elements break joints. The channels $B^{10}$ in the sections are enlarged at the adjacent ends of the sections, and the rear wall of the enlarged portion is inclined relative to the inner face of the superheater to provide for hand hole openings $B^5$ adapted to permit the insertion of a suitable tool for expanding the ends of sleeves EA connecting the adjacent ends of the sections. Aside from the manner in which the sections are connected, the construction shown in Figs. 8, 9 and 10 may be like that shown in Figs. 1 to 6, but as shown, each of the cast metal sections of Figs. 7, 8 and 9 instead of being provided with a single central stiffening rib at its rear, is provided with two ribs $B^6$, one at each side of the section. The adjacent ribs $B^6$ of adjacent elements are connected by bolts passing through those ribs, which may or may not also be connected to stiffening and aligning members, such as the bars $g$ of the construction first described.

While the present invention was primarily devised for, and is of especial value for use in the construction of radiant heat superheaters, it may be used for other purpose. For example, our invention may be employed in the boiler heating surface proper, of a steam generating boiler as illustrated in Fig. 10. In the construction shown in Fig. 10, the rear wall of the combustion chamber L of a boiler furnace is formed by, or incorporates heating surface elements BB which may be similar in construction to the superheater elements B or BA, hereinbefore described, and are connected at their upper ends to the upper headers L' of a water tube boiler, while the lower headers $L^2$ of the boiler, are connected by piping M and a header M' to the lower ends of the elements BB.

While in accordance with the provisions of the statutes we have illustrated and described the best forms of our invention now known to us, it will be apparent to those skilled in the art, that changes may be made in the form of the apparatus disclosed, without departing from the spirit of our invention as set forth in the appended claims, and that certain features of our invention may sometimes be used to advantage without a corresponding use of other features.

Having now described our invention, what we claim as new and desire to secure by Letters Patent, is:

1. Fluid heating apparatus formed of elements each consisting of a plurality of hollow metal conduit sections having massive walls and placed end to end with their adjacent ends in contact and connected by internal nipples, said elements being assembled into a structure having a smooth heat absorbing surface and adapted to be exposed to the interior of a furnace chamber to receive radiant heat at said smooth surface and transmit it to a fluid flowing through said hollow sections.

2. Fluid heating apparatus formed of elements each consisting of a plurality of hollow cast metal sections having massive walls and placed end to end with their adjacent ends in contact and connected by internal nipples and welded together to seal the joints between the sections, said elements being assembled into a structure having a smooth heat absorbing surface and adapted to be exposed to the interior of a furnace chamber to receive radiant heat at said smooth surface and transmit it to a fluid flowing through said hollow sections.

3. A radiant heat superheater adapted to be incorporated in the wall of a boiler furnace and composed of separate and separable conduit sections each having an integral massive wall and each having said wall flattened at one side of said element and having its conduit passage elongated transversely to its length in a direction parallel to said side, said sections being arranged to provide a smooth heat absorbing surface of which the flattened side of each section forms a part.

4. In fluid heating apparatus having a combustion chamber in which fuel is burned at high temperatures, a plurality of metallic radiant heat absorbing fluid conduit elements, each having an integral massive wall of substantially uniform thickness and being of general rectangular internal and external outline in transverse cross section, one side of said wall being exposed to heat radiation from said chamber, and said elements being heated mainly by radiant heat absorbed at said side from said chamber, the transverse cross sectional dimensions of each of said elements and of the channel therein being greater in a direction parallel to said side than in a direction transverse thereto.

5. In a steam generator having a combustion chamber in which fuel is burned at high temperatures, a radiant heat absorbing steam superheater comprising a plurality of steam conduit elements arranged in side by side relation, each of said elements having a plurality of integral massive steel walls, the inner wall of each of said elements being of uniform thickness and having a flat face of substantial area exposed to and absorbing radiant heat from said combustion chamber, connections to the end portions of said elements for the passage therethrough of steam to be superheated, and said elements being proportioned and arranged relative to said combustion chamber as to acquire a major portion of the necessary heat for the superheating effect by the absorption of radiant heat at a relatively rapid rate from said combustion chamber.

6. In a steam generator having a combustion chamber in which fuel is burned at high temperatures, a radiant heat absorbing steam superheater comprising a plurality of steam conduit elements arranged in side by side relation, each of said elements having a plurality of integral massive steel walls, the inner walls of said elements being of uniform thickness and forming a substantially continuous smooth surface exposed to and absorbing radiant heat from said combustion chamber, connections to the end portions of said elements for the passage therethrough of steam to be superheated, and said elements being proportioned and arranged relative to said combustion chamber as to acquire a major portion of the necessary heat for the superheating effect by the absorption of radiant heat at a relatively rapid rate from said combustion chamber.

7. In a steam generator having walls defining a combustion chamber in which fuel is burned at high temperatures, a radiant heat absorbing steam superheater comprising a plurality of steam conduit elements arranged in side by side relation and lining one of the walls of said combustion chamber, each of said elements having a plurality of integral massive steel walls arranged to form an element of rectangular internal and external outline in transverse cross section, the inner walls of each of said elements being of uniform thickness and coacting with the inner walls of the other elements to form a substantially continuous smooth surface exposed to and absorbing radiant heat from said combustion chamber, connections to the end portions of said elements for the passage therethrough of steam to be superheated, and said elements being proportioned and arranged relative to said combustion chamber as to acquire a major portion of the necessary heat for the superheating effect by the absorption of radiant heat by said exposed wall surface.

Signed by JOHN E. BELL, at Milwaukee in the county of Milwaukee and State of Wisconsin this 23 day of April A. D. 1923.

JOHN E. BELL.

Signed by JOHN ANDERSON, at Milwaukee in the county of Milwaukee and State of Wisconsin this 17th day of April A. D. 1923.

JOHN ANDERSON.